US006040901A

United States Patent [19]

Stapfer et al.

[11] Patent Number: 6,040,901

[45] Date of Patent: Mar. 21, 2000

[54] DEVICE FOR OPTICALLY DETECTING SHEET MATERIAL

[75] Inventors: Michael Stapfer; Michael Fiedler, both of Munich, Germany

[73] Assignee: Giesecke & Devrient GmbH, Munich, Germany

[21] Appl. No.: 09/147,257

[22] PCT Filed: Mar. 13, 1998

[86] PCT No.: PCT/EP98/01484

§ 371 Date: Jan. 5, 1997

§ 102(e) Date: Jan. 5, 1997

[87] PCT Pub. No.: WO98/41955

PCT Pub. Date: Sep. 24, 1998

[30] Foreign Application Priority Data

Mar. 14, 1997 [DE] Germany ........................... 197 10 621

[51] Int. Cl.[7] ........................................ G06K 9/74

[52] U.S. Cl. ........................................ 356/71

[58] Field of Search .............................. 356/71, 372, 373, 356/375, 388, 394; 382/135, 137, 138, 140

[56] References Cited

U.S. PATENT DOCUMENTS 5,847,859 12/1998 Murata .................................. 359/201

*Primary Examiner*—Frank G. Font
*Assistant Examiner*—Michael P. Stafira
*Attorney, Agent, or Firm*—Bacon & Thomas, PLLC

[57] ABSTRACT

The apparatus positions an area on the sheet material, the area being detected with high resolution. For this purpose a reflection device with a plurality of reflectors is provided for deflecting the light emitted by the area of the sheet material in the direction of a sheet material axis in the direction of a detector axis. An adjusting device is used to change the position of at least two reflectors for fixing the position of the area on the sheet material relative to the detection device. The reflectors are disposed so that the length of the optical path of the emitted light from the sheet material to the detection device is equal in the total area of the sheet material and at least in a plurality of positions of the reflection device adjustable by the adjusting device.

6 Claims, 3 Drawing Sheets

DEVICE FOR OPTICALLY DETECTING SHEET MATERIAL

BACKGROUND OF THE INVENTION

This invention relates to an apparatus for optical detection of sheet material such as bank notes or papers of value.

DE 195 17 194 A1 discloses an apparatus with a stationary detection device for detecting the light of an area of the sheet material incident from the direction of a detector axis and emitted in the direction of an optical sheet material axis. For optical detection the sheet material is transported past the stationary detection device along a transport direction. The area detected by the detection device comprises the total width of the sheet material perpendicular to the transport direction so that the total surface of the sheet material is detected when it is transported past.

In addition, an illumination device is provided for illuminating the sheet material during detection. The illumination device has components for illuminating the sheet material from both sides so that the detection device can detect both reflected and transmitted light.

The resolution of the apparatus is about 50 dpi. For certain applications, such as the detection of a bank note number on a bank note by means of optical character recognition (OCR) software, this resolution is deficient. Increasing the resolution to about 250 dpi, e.g. for detecting a bank note number, leads to very high data rates which are about a factor of 25 higher than the data rates of the known apparatus. The problem here is that such data rates can only be processed with high effort, if at all.

SUMMARY OF THE INVENTION

Starting out from this, the invention is based on the problem of proposing an apparatus for optical detection of sheet material which permits high resolution during detection at a data rate requiring little effort to process.

The basic idea of the invention is essentially that only an area of the sheet material which is preferably smaller than the total width of the sheet material is detected with high resolution. The area is selected on the sheet material so that the areas on the sheet material necessary for the intended application are detected with high resolution. For this purpose a reflection device with a plurality of reflectors is provided for deflecting the light emitted by the area of the sheet material in the direction of the sheet material axis in the direction of the detector axis. An adjusting device can be used to change the position of at least two reflectors for fixing the position of the area on the sheet material relative to the detection device. The reflectors are disposed so that the length of the optical path of the emitted light from the sheet material to the detection device is independent of the position of the area on the sheet material.

An advantage of the apparatus is that the areas relevant for intended applications can be detected with high resolution. Due to the preferably stationary detection device a particular adjustment is retained. The constant length of the optical path during detection ensures that once an imaging system is adjusted it need not be changed when the position of the area on the sheet material is fixed. Since the adjusting device only changes the position of the relatively lightweight reflectors and there is thus no motion of relatively large masses, the relevant area on the sheet material can be adjusted very precisely with simple means.

In a first preferred embodiment, the detector axis and the sheet axis are disposed parallel. A first reflector forms with the detector axis a first angle of reflection of 45°, and a second detector with the sheet material axis a second reflector angle of 45°. For fixing the position of the area on the sheet material the reflectors are shifted by the adjusting device parallel in a direction perpendicular to the detector axis or the sheet material axis.

In a second preferred embodiment, the detector axis and the sheet material axis form a fixed axis angle. A first reflector forms with the detector axis a first reflector angle, and a second reflector forms with the sheet material axis a second reflector angle, the second reflector angle resulting as 90° minus half the axis angle minus the first angle of reflection. For fixing the position of the area on the sheet material the reflectors are shifted by the adjusting device parallel in a direction perpendicular to the median line of the axis angle.

Further features and advantages of the invention can be found in the subclaims and the following embodiments of the invention described with reference to the figures, in which:

DETAILED DESCRIPTION OF THE DRAWINGS

Figure 1:
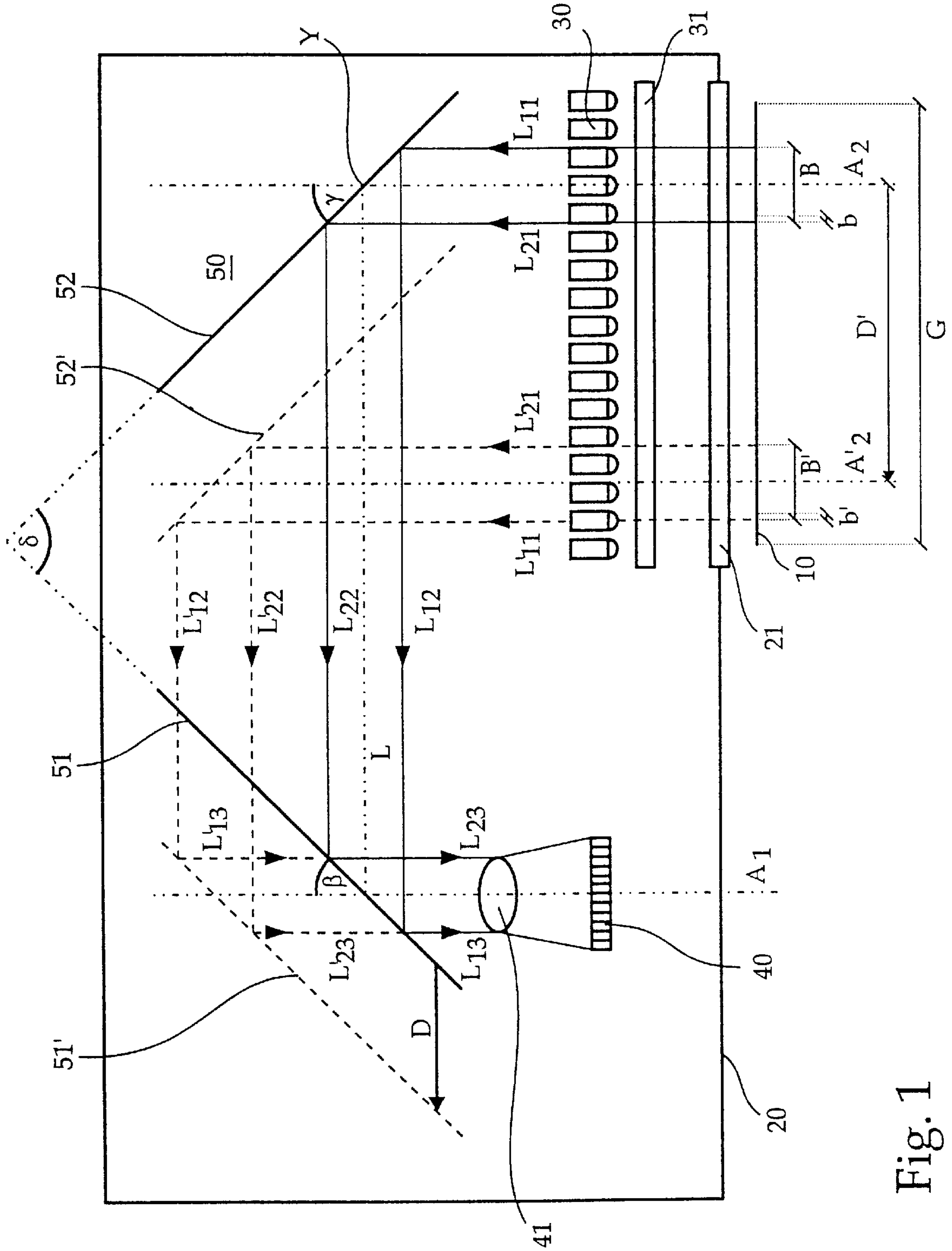
FIG. 1 shows a schematic diagram of a side view of a first embodiment.
Figure 2:
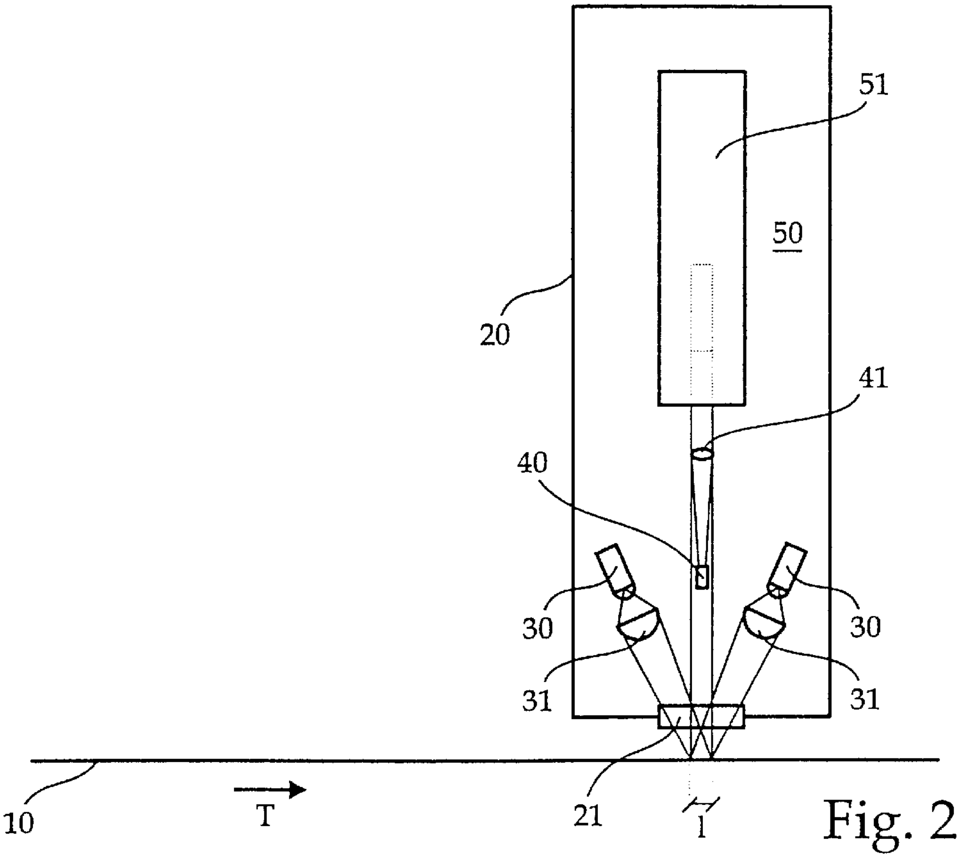
FIG. 2 shows a schematic diagram of a frontal view of the first embodiment.

FIGS. 1 and 2 show a schematic diagram of a first embodiment of the invention in side and frontal views. For detection, sheet material 10 is transported past housing 20 along transport direction T. Through window 21 in housing 20 sheet material 10 is illuminated or the light emitted by the sheet material at least partly detected. Illumination device 30 is executed here as an array of light-emitting diodes disposed perpendicular to transport direction T of the sheet material and at a certain angle to sheet material axis $A_2$ or $A'_2$. The light emitted by light-emitting diodes 30 first passes through imaging system 31 and then through window 21 and illuminates an area of sheet material 10. The area extends in transport direction T at least over length l and perpendicular to transport direction T over total width G of sheet material 10. To obtain high light intensity from the light-emitting diodes, they can be operated in pulsed mode, the light-emitting diodes being supplied for short times with a current higher than the current in continuous operation of the light-emitting diode.

Alternatively to the execution as an array of light-emitting diodes, illumination device 30 can also be executed if required with other means, such as light bulbs in conjunction with corresponding reflectors. Further, illumination device 30 can be mounted, or at least have components, in such a way that sheet material 10 is illuminated from the side opposite housing 20. This makes it possible to detect light reflected and/or transmitted by sheet material 10.

The light emitted by sheet material 10 in the direction of sheet material axis $A_2$ or $A'_2$ is deflected by reflection device 50 in the direction of detector axis $A_1$. The light deflected in the direction of detector axis $A_1$ is detected by a preferably stationary detection device. The latter preferably has CCD array 40 on which the light deflected in the direction of detector axis $A_1$ is imaged by imaging system 41. In the first embodiment, detector axis $A_1$ and sheet material axis $A_2$ or $A'_2$ are disposed parallel. First reflector 51 of reflection device 50 is disposed so as to form with detector axis $A_1$ first reflector angle $\beta$. It holds that $0<\beta<90°$. This causes optical path L of the light along detector axis $A_1$ to intersect sheet material axis $A_2$ at point Y. At point Y second reflector 52 of reflection device 50 is provided which forms with sheet material axis $A_2$ second reflector angle $\gamma$ with $\gamma=90°-\beta$. Reflectors 51 and 52 thus form angle $\delta=90°$. One preferably selects $\beta=\gamma=45°$.

Further, reflectors 51, 52 are preferably executed so that they completely reflect the light hitting them. For certain applications, however, it is possible to design at least individual reflectors to be for example semitransparent, dichroic or polarizing. Further, it is also possible to use prisms as reflectors if required.

The light emitted by sheet material 10 in area B in the direction of sheet material axis $A_2$ is reflected by second reflector 52 onto first reflector 51 and from there in the direction of detector axis $A_1$ to the detection device. The arrangement of reflectors 51 and 52 ensures that length L of the optical path of the emitted light from sheet material 10 to the detection device is equal in total area B of the sheet material. It holds that $L=L_{11}+L_{12}+L_{13}=L_{21}+L_{22}+L_{23}$. This permits total area B of the sheet material to be imaged on detector 40 with imaging system 41 without any problem.

Detector axis $A_1$ is preferably perpendicular on CCD array 40 and sheet material axis $A_2$ or $A'_2$ perpendicular on sheet material 10 so as to ensure distortion-free imaging of area B of sheet material 10 on CCD array 40 of the detection device. If detector axis $A_1$ is not perpendicular on CCD array 40 and/or sheet material axis $A_2$ or $A'_2$ is not perpendicular on sheet material 10, the resulting distortions can be compensated for example by suitable imaging system 41. Another way of compensating such distortions is to take them into account in the evaluation of the measured values detected by CCD array 40.

An adjusting device not shown here can be used to change the position of reflectors 51 and 52 for fixing the position of area B on the sheet material relative to the detection device. For this purpose, reflectors 51 and 52 are shifted parallel in direction D perpendicular to detector axis $A_1$ or to sheet material axis $A_2$. The shifted position of reflectors 51 and 52 is designated 51' and 52' and shown by dash lines in FIG. 1. Area B is shifted as area B' in direction D'. It holds that $D'=2*D$.

The length of reflectors 51 and 52 is preferably selected so that the light emitted over total width G of sheet material 10 in the direction of sheet material axis $A_2$ or $A'_2$ is deflected in the direction of the detector axis. The widths of reflectors 51 and 52 are preferably selected so that the light emitted in the direction of sheet material axis $A_2$ or $A'_2$ falls completely on imaging system 41. This avoids a limitation of the ray path. The arrangement of reflectors 51 and 52 ensures that length L of the optical path is equal over total width G of sheet material 10 and specifically also in area B'. It holds that $L'=L'_{11}+L'_{12}+L'_{13}=L'_{21}+L'_{22}+L'_{23}=L$.

The arrangement of reflectors 51 and 52 thus permits area B to be positioned at will over total width G of sheet material 10, length L of the optical path being retained so that once imaging system 41 is adjusted to length L of the optical path it need not be readjusted. Since reflectors 51 and 52 are relatively light they can be adjusted very precisely with simple means, such as stepping motors.

Figure 3:
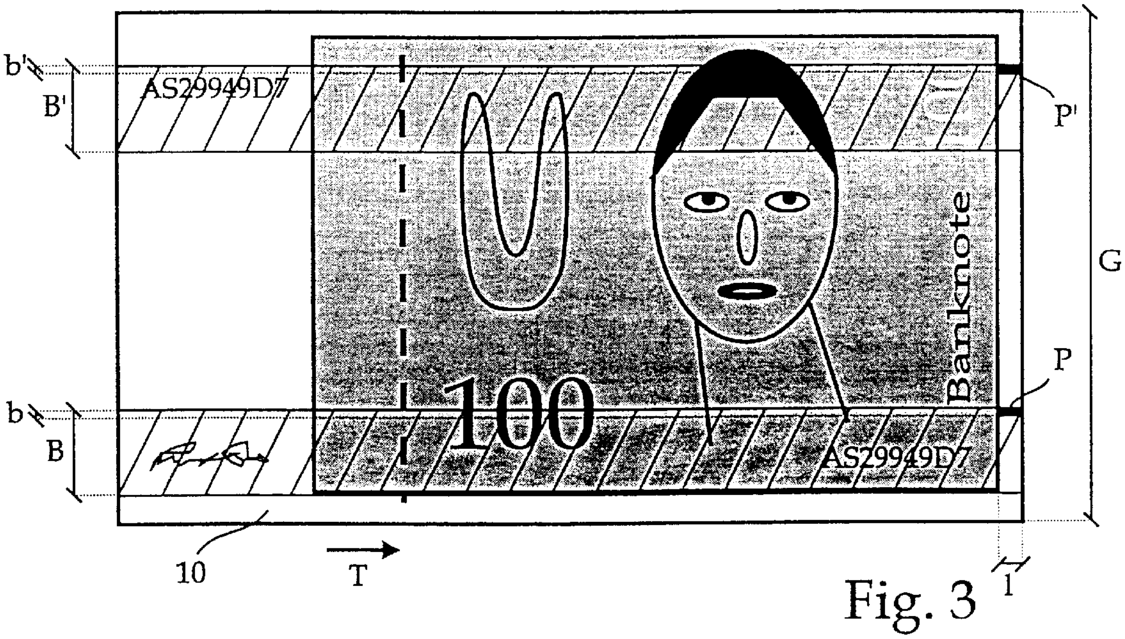
FIG. 3 shows the position of the detected areas on the sheet material.

FIG. 3 shows the position of areas B and B' on sheet material 10. These areas were selected here so that the bank note numbers of the bank note shown each fall in one of the areas. The resolution of the apparatus depends on number N of the pixels of CCD array 40 and on desired width b of a picture element on the sheet material. For the size of picture element P on sheet material 10 it holds that $P=l*b$. For a desired resolution of 250 dpi one selects $l=b=0.1$ mm. With number $N=256$ pixels of the CCD array the width of area B results as $B=N*b=25.6$ mm.

At a desired transport speed of the bank note of $T=10$ m/s and a color depth of 1 byte per pixel, corresponding to 256 gray values, data rate D results as $D=N*T*F/l=25.6$ MB/s. To lower data rate D one can for example also select number N of pixels as $N<256$ pixels which are relevant for the intended application.

Figure 4:
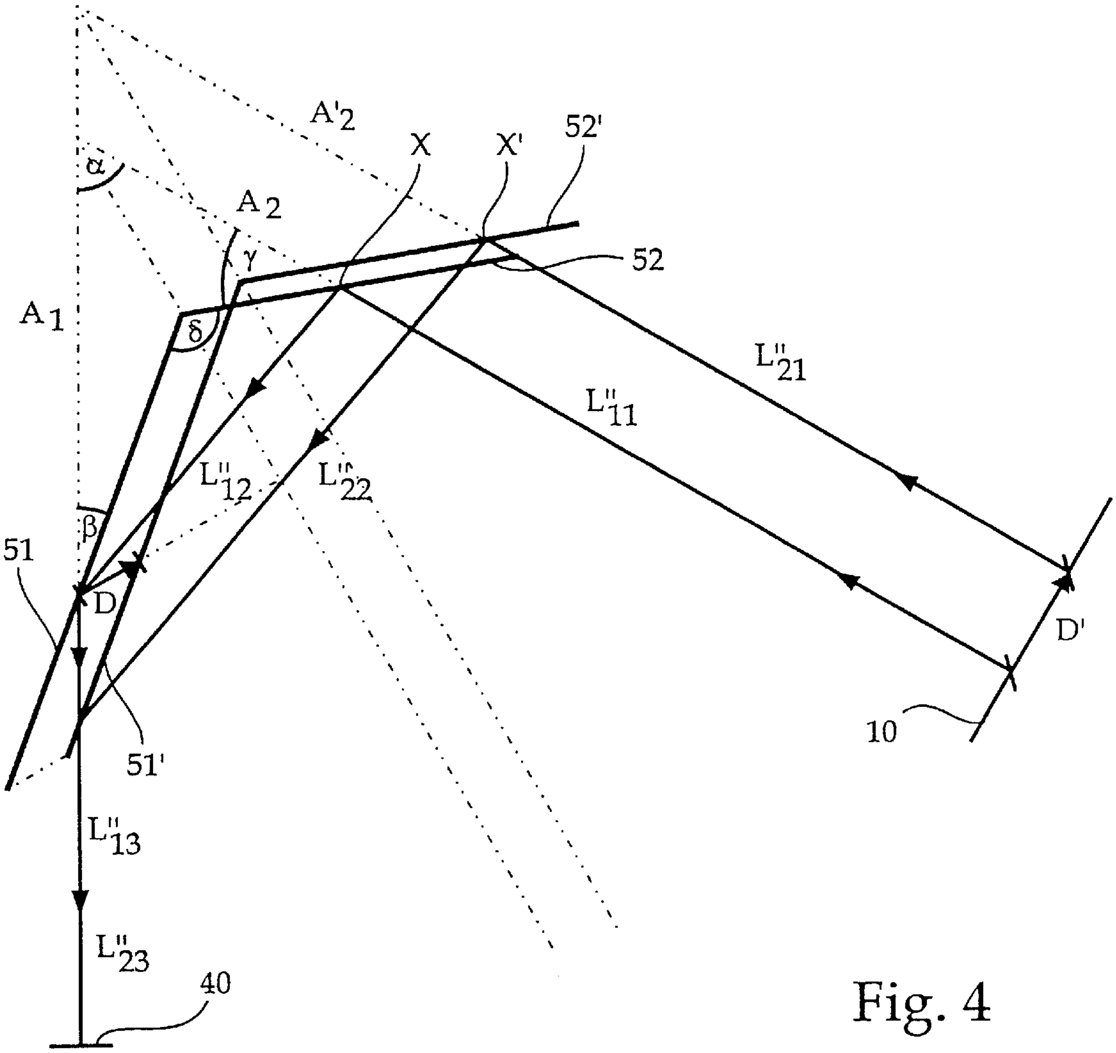
FIG. 4 shows a schematic diagram of a second embodiment of the invention.

FIG. 4 shows a schematic diagram of a second embodiment of the invention in which detector axis $A_1$ and sheet material axis $A_2$ or $A'_2$ form axis angle $\alpha$. It holds that $0<\alpha<180°$. Axis angle $\alpha$ is thus determined by the position of detector 40 and sheet material 10 relative to each other. In detector axis $A_1$ there is first reflector 51 which forms reflector angle $\beta$ with the detector axis, it holding that $0<\beta<90°-\alpha/2$. This makes optical path L intersect sheet material axis $A_2$ at point X. First reflector angle $\beta$ can in principle be selected freely within the stated range.

Further, at intersection point X there is second reflector 52 which forms with sheet material axis $A_2$ second reflector angle $\gamma$ resulting from axis angle $\alpha$ and first reflector angle $\beta$. It holds that $\gamma=90°-\alpha/2-\beta$. This arrangement results in reflectors 51 and 52 forming angle $\delta$ with $\delta=90°+\gamma2$.

To shift the intersection point of optical axis $A_2$ with sheet material 10 in direction D' into the intersection point of sheet material 10 with sheet material axis $A'_2$ reflectors 51 and 52 are shifted parallel in direction D perpendicular to the median line of axis angle $\alpha$. It holds that $D'=2*D*\cos(\alpha/2)$. With this arrangement of reflectors 51 and 52 the length of the optical path is also retained. It holds that $L''_{11}+L''_{12}+L''_{13}=L''_{21}+L''_{22}+L''_{23}$.

An advantage of the second embodiment of the invention is that a shift of area B to be detected can be realized virtually with any relative arrangement between sheet material 10 and detector 40. To obtain an arrangement as compact as possible one can optionally dispose further additional stationary reflectors in optical path L. These additional stationary reflectors are also disposed so that the optical path is retained in the positions of reflection device 50 adjustable by the adjusting device.

We claim:

1. An apparatus for optical detection of sheet material, for example bank notes, having

- a detection device (40, 41) for detecting the light of an area (B) of the sheet material (10) incident from the direction of an optical detector axis ($A_1$) and emitted by the sheet material (10) in the direction of an optical sheet material axis ($A_2$, $A'_2$),
- an illumination device (30, 31) for illuminating at least the area (B) of the sheet material (10), characterized in that

- a reflection device (50) with reflectors (51, 52) is provided for deflecting the light emitted by the area (B) of the sheet material (10) in the direction of the sheet material axis in the direction of the detector axis,
- an adjusting device is provided for changing the position of at least two reflectors (51, 52) for fixing the position of the area (B) on the sheet material (10) relative to the detection device (40, 41), and
- the reflectors (51, 52) are disposed so that the length (L) of the optical path of the emitted light from the sheet material (10) to the detector device (40, 41) is independent of the position of the area (B) on the sheet material.

2. The apparatus of claim 1, characterized in that the detector axis ($A_1$) and the sheet material axis ($A_2$, $A'_2$) are disposed parallel, a first reflector (51) forms a first reflector angle (β) with the detector axis ($A_1$), and a second reflector (52) forms with the sheet material axis ($A_2$, $A'_2$) a second reflector angle (γ) of 90° minus the first reflector angle (β).

3. The apparatus of claim 2, characterized in that the adjusting device shifts at least the first and second reflectors (51, 52) parallel in a direction (D) perpendicular to the detector axis ($A_1$) or to the sheet material axis ($A_2$, $A'_2$).

4. The apparatus of claim 1, characterized in that the detector axis ($A_1$) and the sheet material axis ($A_2$, $A'_2$) form an axis angle (α), a first reflector (51) forms a first reflector angle (β) with the detector axis ($A_1$), and a second reflector (52) forms a second reflector angle (γ) with the sheet material axis ($A_2$, $A'_2$), the second reflector angle (γ) resulting as 90° minus half the axis angle (α) minus the first reflector angle (β).

5. The apparatus of claim 4, characterized in that the adjusting device shifts at least the first and second reflectors (51, 52) parallel in a direction (D) perpendicular to the median line of the axis angle (α).

6. The apparatus of any of claim 1, characterized in that the reflection device (50) has at least one stationary reflector.

* * * * *